United States Patent
Garcia et al.

(10) Patent No.: US 10,747,439 B2
(45) Date of Patent: Aug. 18, 2020

(54) METHOD AND APPARATUS FOR POWER-FAIL SAFE COMPRESSION AND DYNAMIC CAPACITY FOR A STORAGE DEVICE

(71) Applicant: Intel Corporation, Santa Clara, CA (US)

(72) Inventors: Rowel S. Garcia, North Plains, OR (US); Sanjeev N. Trika, Portland, OR (US); Jawad B. Khan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 15/910,476

(22) Filed: Mar. 2, 2018

(65) Prior Publication Data

US 2019/0042111 A1 Feb. 7, 2019

(51) Int. Cl.
*G06F 3/06* (2006.01)
*G06F 11/14* (2006.01)

(52) U.S. Cl.
CPC ........ *G06F 3/0608* (2013.01); *G06F 11/1471* (2013.01); *G06F 3/0638* (2013.01)

(58) Field of Classification Search
CPC ...... G06F 3/0608; G06F 3/0638; G06F 3/064; G06F 11/1471
See application file for complete search history.

(56) References Cited

U.S. PATENT DOCUMENTS

| | | | |
|---|---|---|---|
| 8,645,664 B1* | 2/2014 | Colgrove | G06F 3/0608 711/206 |
| 8,806,160 B2* | 8/2014 | Colgrove | G06F 3/0671 711/162 |
| 2015/0012693 A1* | 1/2015 | Amit | G06F 3/064 711/104 |
| 2016/0378352 A1 | 12/2016 | Khan et al. | |
| 2017/0336981 A1 | 11/2017 | Garcia et al. | |

OTHER PUBLICATIONS

NVM Express Revision 1.3, May 1, 2017, 282 pages.

* cited by examiner

*Primary Examiner* — Joseph R Kudirka
(74) *Attorney, Agent, or Firm* — Compass IP Law, PC (57) ABSTRACT

Power-fail safe compression and dynamic capacity for a storage device in a computer system is provided. Metadata stored with each logical block in non-volatile memory in the storage device ensures that the mapping table may be recovered and stored in volatile memory for use by the computer system after power is restored to the computer system. In addition, the metadata ensures that a list of free logical block addresses written to the storage device prior to shutting down the computer system to provide access to the additional capacity that is available in the storage device by storing compressed data in the storage device may also be recovered.

25 Claims, 7 Drawing Sheets

| I/O Request Number 402 | Host LBA 404 | Storage Device LBA 406 | Number of Compressed Sectors 408 |

| Number of Consecutive Free Sectors 410 | Storage Device LBA(s) 412 |

METHOD AND APPARATUS FOR POWER-FAIL SAFE COMPRESSION AND DYNAMIC CAPACITY FOR A STORAGE DEVICE

FIELD

This disclosure relates to storage devices and in particular to power-fail safe compression and dynamic capacity for a storage device.

BACKGROUND

A computer system typically includes a volatile system memory, for example, a Dynamic Random Access Memory (DRAM) and a storage device that includes non-volatile memory. Storage devices that include non-volatile memory include a secure digital card, a multimedia card, a flash drive (for example, a Universal Serial Bus (USB) flash drive also known as a "USB thumb drive" or "USB memory stick" that includes non-volatile memory with an integrated USB interface), and a solid-state drive.

Volatile memory is memory whose state (and therefore the data stored in it) is indeterminate if power is interrupted to the device. Dynamic volatile memory requires refreshing the data stored in the device to maintain state.

Nonvolatile memory refers to memory whose state is determinate even if power is interrupted to the device. A logical block is the smallest addressable data unit for read and write commands to access data stored in the storage device. The address of the logical block is commonly referred to as a Logical Block Address (LBA).

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

Data to be stored in the storage device may be compressed prior to being written to the storage device. The compressed data uses less logical blocks in the storage device to store the data than the number of logical blocks used to store the uncompressed data in volatile memory in the computer system. A mapping table stored in the volatile memory in the computer system maintains an entry for each original host LBA. The entry includes the storage device LBA in the storage device that stores the compressed data. Prior to shutting down the computer system, the mapping table stored in volatile memory may be written to non-volatile memory in the storage device. However, if power is unexpectedly interrupted to the computer system, the mapping table stored in volatile memory in the computer system is no longer available when power is restored.

In an embodiment, the storage device is a Solid-State Drive (SSD), metadata stored with each logical block in non-volatile memory in the SSD ensures that the mapping table may be recovered and stored in volatile memory for use by the computer system after power is restored to the computer system. In addition, the metadata ensures that a list of free logical block addresses written to the non-volatile memory in the SSD prior to shutting down the computer system to provide access to the additional capacity that is available in the SSD by storing compressed data in the SSD may also be recovered.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature structure, or characteristic described in conjunction with the embodiment can be included in at least one embodiment of the invention. The appearances of the phrase "in one embodiment" in various places in the specification do not necessarily all refer to the same embodiment.

Figure 1:
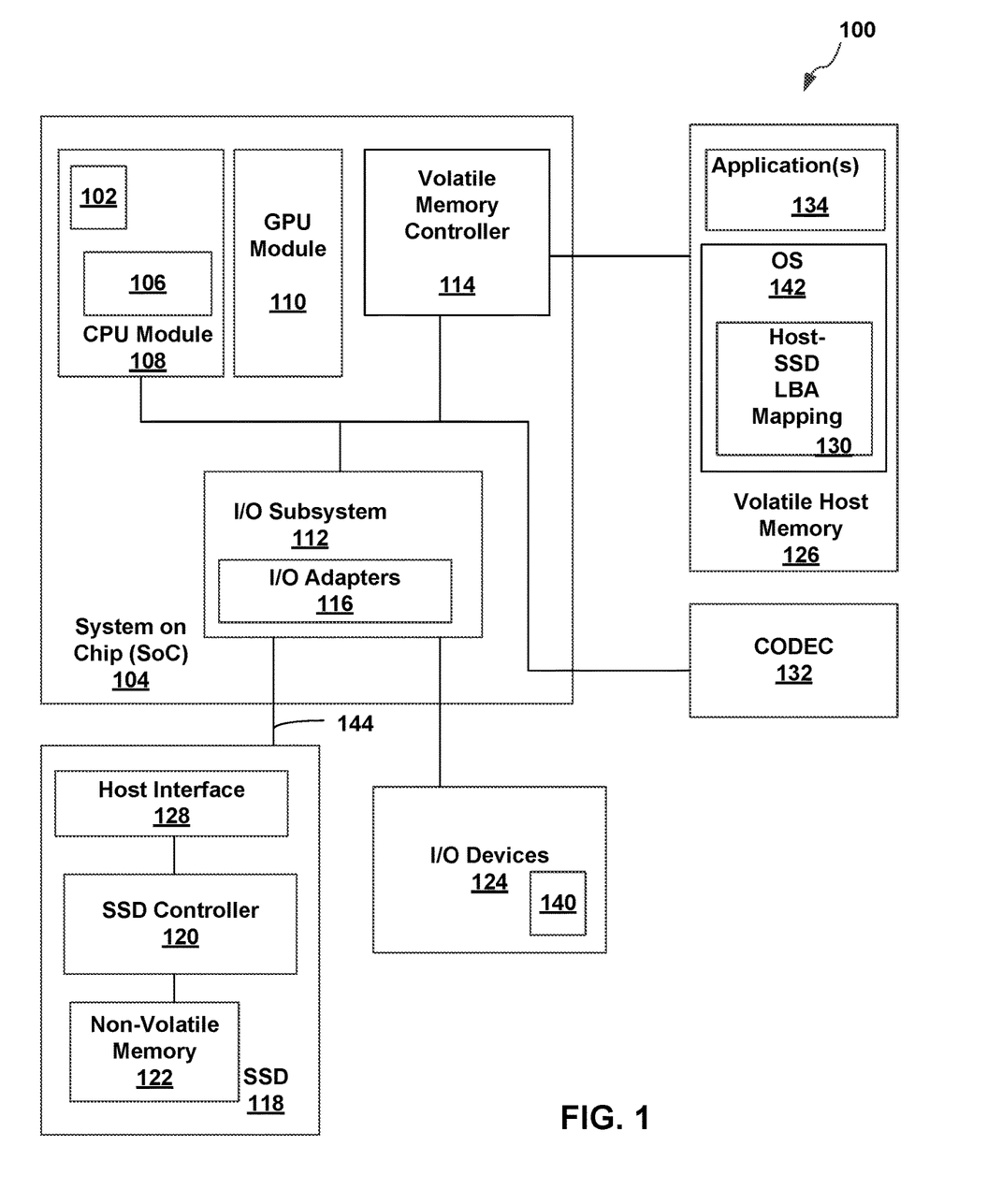
FIG. 1 is a block diagram of an embodiment of a computer system to generate metadata to be stored with compressed data in non-volatile memory in a solid-state drive in the computer system.

FIG. 1 is a block diagram of an embodiment of a computer system 100 to generate metadata to be stored with compressed data in non-volatile memory 122 in a solid-state drive (SSD) 118 in the computer system 100. Computer system 100 may correspond to a computing device including, but not limited to, a server, a workstation computer, a desktop computer, a laptop computer, and/or a tablet computer.

The computer system 100 includes a system on chip (SOC or SoC) 104 which combines processor, graphics, memory, and Input/Output (I/O) control logic into one SoC package. The SoC 104 includes at least one Central Processing Unit (CPU) module 108, a volatile memory controller 114, and a Graphics Processor Unit (GPU) 110. In other embodiments, the volatile memory controller 114 may be external to the SoC 104. Although not shown, each of the processor core(s) 102 may internally include one or more instruction/data caches, execution units, prefetch buffers, instruction queues, branch address calculation units, instruction decoders, floating point units, retirement units, etc. The CPU module 108 may correspond to a single core or a multi-core general purpose processor, such as those provided by Intel® Corporation, according to one embodiment.

The Graphics Processor Unit (GPU) 110 may include one or more GPU cores and a GPU cache which may store graphics related data for the GPU core. The GPU core may internally include one or more execution units and one or more instruction and data caches. Additionally, the Graphics Processor Unit (GPU) 110 may contain other graphics logic units that are not shown in FIG. 1, such as one or more vertex processing units, rasterization units, media processing units, and codecs.

Within the I/O subsystem 112, one or more I/O adapter(s) 116 are present to translate a host communication protocol utilized within the processor core(s) 102 to a protocol compatible with particular I/O devices. Some of the protocols that adapters may be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 116 may communicate with external I/O devices 124 which may include, for example, user interface device(s) including a display and/or a touchscreen display 140, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices may be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols. The I/O adapter(s) may also communicate with a solid-state drive ("SSD") 118 which includes a SSD controller 120, a host interface 128 and non-volatile memory 122 that includes one or more non-volatile memory devices.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The I/O adapters 116 may include a Peripheral Component Interconnect Express (PCIe) adapter that is communicatively coupled using the NVMe (NVM Express) over PCIe (Peripheral Component Interconnect Express) protocol over bus 144 to a host interface 128 in the SSD 118. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus. The NVM Express standards are available at www.nvmexpress.org. The PCIe standards are available at www.pcisig.com.

The computer system 100 also includes a compression/decompression (CODEC) module 132 communicatively coupled to the CPU module 108 in the SoC 104. In an embodiment, the CODEC module 132 may be an Application Specific Integrated Circuit (ASIC).

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

An operating system 142 is software that manages computer hardware and software including memory allocation and access to I/O devices. Examples of operating systems include Microsoft® Windows®, Linux®, iOS® and Android®.

Figure 2:
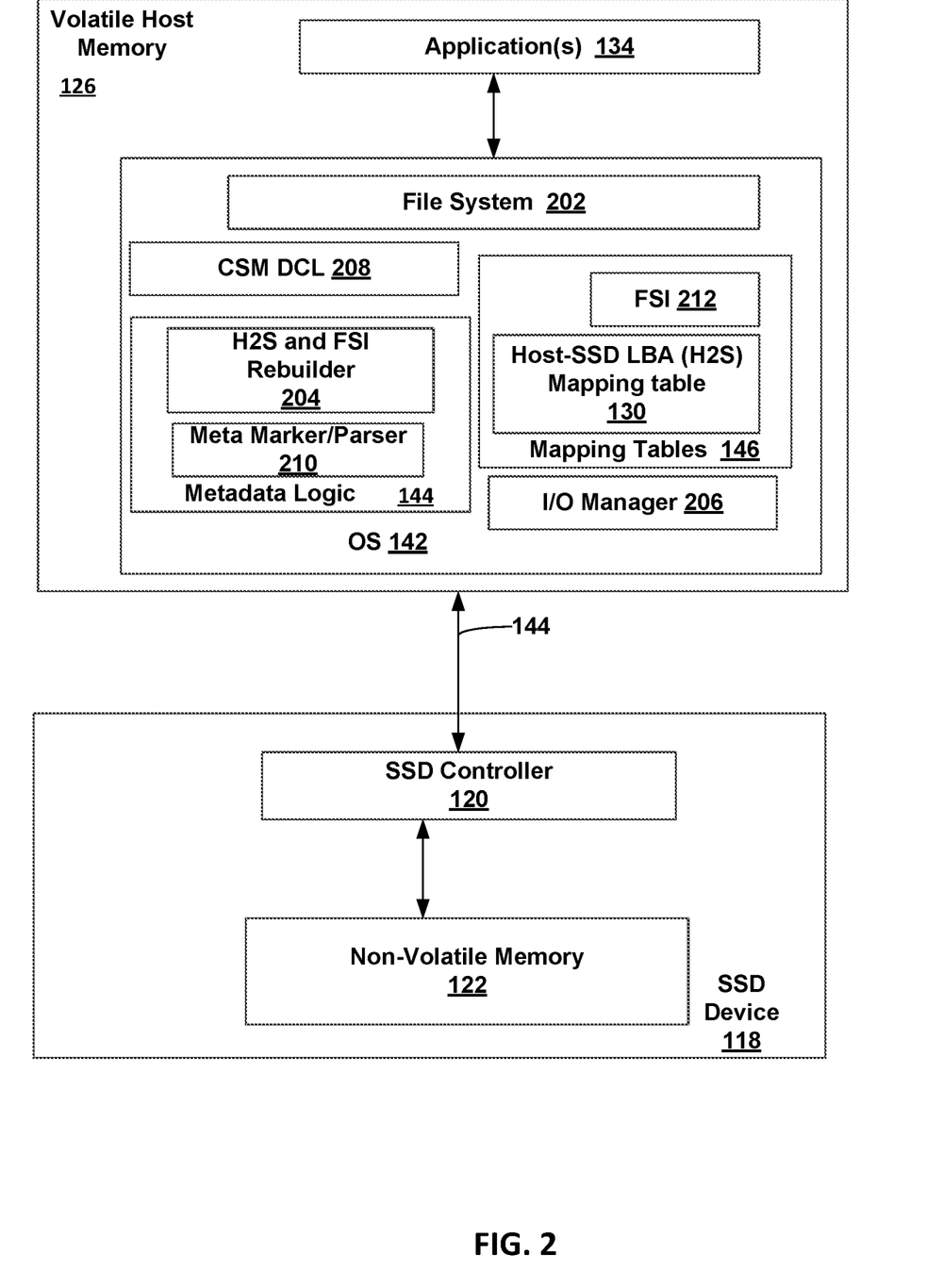
FIG. 2 is a block diagram of an embodiment of power-fail safe compression and dynamic capacity for a storage device in the host volatile memory shown in FIG. 1.

FIG. 2 is a block diagram of an embodiment of power-fail safe compression and dynamic capacity for a storage device in the volatile host memory 126 shown in FIG. 1.

The processor core(s) 102 may execute an application(s) 134 that issues read/write requests to a file system 202 in the operating system 142. The operating system 142 includes an Input/Output (I/O) manager 206 to manage read/write requests from the file system 202 to the SSD 118; Compressed Space Management and Dynamic Capacity Logic (CSM DCL) 208 to manage compression/decompression operations; Mapping tables 146; and Metadata logic 144.

The Metadata logic 144 includes H2S and FSI rebuilder logic 204 to rebuild the Host-SSD LBA (H2S) Mapping table 130 and the free space information table (FSI) 212 and meta marker/parser logic 210 to generate the metadata to be stored with the compressed data in the SSD 118 and to parse the stored metadata to rebuild the tables after an unexpected power loss.

The mapping tables 146 includes a Host-SSD LBA (H2S) mapping table 130 a free space information table (FSI) 212. The H2S mapping table 130 stores a map of host LBAs to storage device LBAs and the number of sectors storing compressed data for the host LBA. The free space information table (FSI) 212 stores SSD LBAs that are free or available for use.

A sector is the minimum storage unit of the non-volatile memory in the SSD 118. An embodiment will be described for a SSD 118 with a sector size of 512 bytes and a read/write request for 8 sectors (4 Kilobytes). In other embodiments, the sector may store a different number of bytes and the read/write request may be for a more or less sectors. In an embodiment in which the SSD 118 is communicatively coupled using the NVMe (NVM Express) over PCIe (Peripheral Component Interconnect Express) protocol over bus 144, the SSD 118 supports storing additional data commonly referred to as metadata (data that provides information about other data) that is allocated on a per logical block basis and stored with the compressed data in the non-volatile memory 122 in the SSD 118.

Figure 3A:
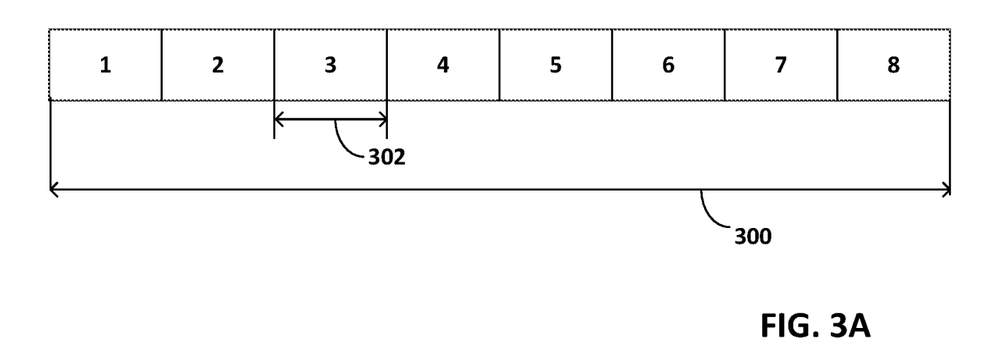
FIG. 3A illustrates uncompressed data to be written to the SSD.

FIG. 3A illustrates uncompressed data 300 to be written to the SSD 118. Each of the eight sectors 302 in the uncompressed data 300 has 512 bytes (B) for a total of 4 KiloBytes (KB) of uncompressed data 300. The uncompressed data 300 is compressed by CODEC 132.

Figure 3B:
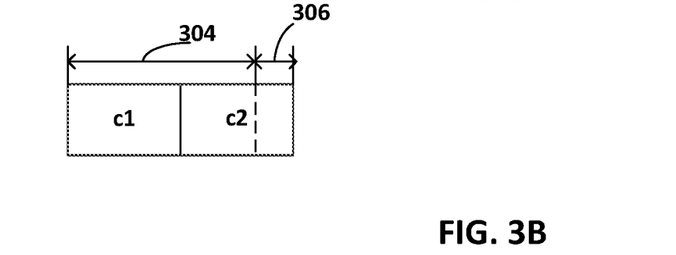
FIG. 3B illustrates compressed data 304 corresponding to the uncompressed data shown in FIG. 3A.

FIG. 3B illustrates compressed data 304 corresponding to the uncompressed data 300 shown in FIG. 3A. The 4 KB of uncompressed data 300 has been compressed to 750 B, 512 B of the compressed data is in sector c1 and 256 B is in sector c2. In an embodiment in which the minimum sector size is 512K, two sectors c1 and c2 are required to store the 750 B compressed data and a pad 306 is written to fill the other 256 B of sector c2.

Figure 3C:
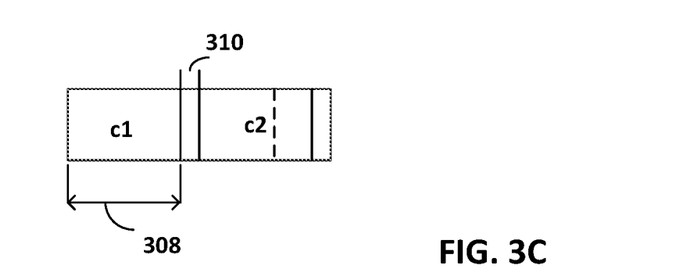
FIG. 3C illustrates metadata that is stored with each sector storing compressed data to ensure that the mapping tables can be recovered after an unexpected system shutdown.

FIG. 3C illustrates metadata 310 that is stored with each sector storing compressed data to ensure that the mapping tables 146 can be recovered after an unexpected system shutdown. In an embodiment, 8 B of metadata 310 is stored with each sector c1, c2 in non-volatile memory 122 in the SSD 118. In an embodiment in which the SSD 118 is communicatively coupled using the NVMe (NVM Express) over PCIe (Peripheral Component Interconnect Express) protocol over bus 144, the metadata 310 is a contiguous part of the SSD logical block that it is associated with. The metadata 310 is transferred as the end of the associated SSD logical block, forming an extended logical block.

Figure 3D:
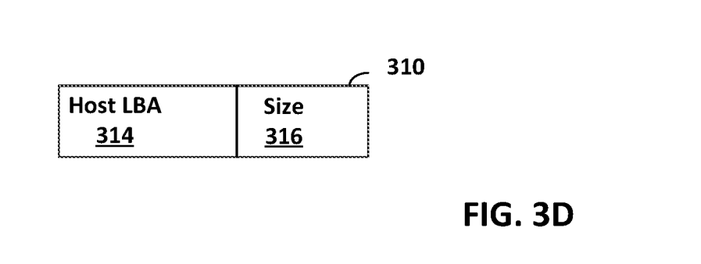
FIG. 3D illustrates an embodiment of the metadata shown in FIG. 3C.

FIG. 3D illustrates an embodiment of the metadata 310 shown in FIG. 3C. The metadata has three fields: Host LBA 314; Size 316; and Timestamp 318. The Meta Marker/Parser 210 logic in the metadata logic 144 generates the metadata 310 to be stored with the compressed sector. In an embodiment, the metadata has 8 bytes (64 bits) to store a 32 bit Host LBA in the Host LBA field 314, a 3-bit number of sectors indicating the number of sectors (0-8) that store the compressed data for the host LBA in the Size field 316 and a 29 bit timestamp to store in the timestamp field 318. For the example described in conjunction with FIGS. 3A and 3B, the number of sectors stored in the sector number field in the metadata is 2 (c1 and c2).

Figure 4A:
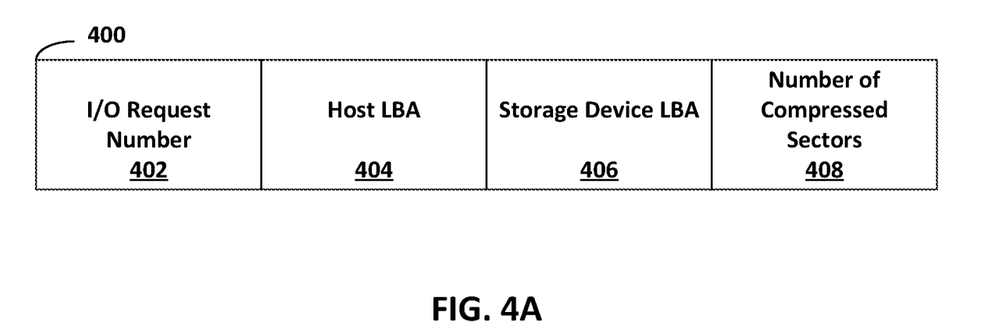
FIG. 4A illustrates an embodiment of a H2S entry in the H2S Mapping table.

FIG. 4A illustrates an embodiment of a H2S entry 400 in the H2S mapping table 130. A H2S entry 400 is added to the H2S Mapping table each time an I/O Request to write one or more consecutive sectors in the SSD 118 is received from the I/O manager 206. A number assigned to the I/O Request is stored in the I/O request number 402 field in the H2S entry 400. A host logical block address identifying the first host block address of the I/O request is stored in a host block address 404 field of the H2S entry 400. A storage device logical block address (LBA) corresponding to the host block address is stored in the storage device LBA 302 field in the H2S entry 400. The number of compressed sectors field 408 stores the number sectors of compressed data.

In other embodiments, each H2S entry 400 may not explicitly include the host block address 404 field, and instead the host block address for the H2S entry 400 may be inferred from the I/O request number 402 or address mapping position in the H2S mapping table 130, as n times the I/O request number 402, where n is the I/O request block size, for example, 8 sectors.

Figure 4B:
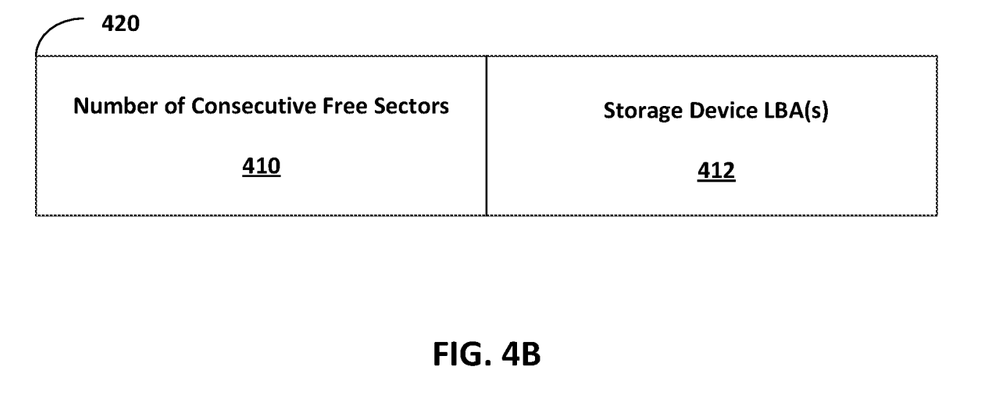
FIG. 4B illustrates a free space list entry in the free space information table including a number of consecutive free sectors and a storage device LBA(s) field to store a storage device logical block address for the number of consecutive free sectors that are available to write compressed data.

FIG. 4B illustrates a free space list entry 420 in the free space information table 212 including a number of consecutive free sectors 410 and a storage device LBA(s) field 412 to store a storage device logical block address for the number of consecutive free sectors that are available to write compressed data. In one embodiment the number of entries 420 in the free space information table 212 may be equal to the total number of sectors in a host I/O request. For example, if there are 8 sectors in a host read or write request, then there are eight entries in the free space information table 212 for 1 through 8 free consecutive sectors. The storage device LBA(s) field 412 may include one or more storage device block addresses or a null value indicating there is no storage device block address in the SSD 118 at which there are free consecutive sectors equal to the corresponding number of consecutive free sectors in the entry 420.

Figure 5:
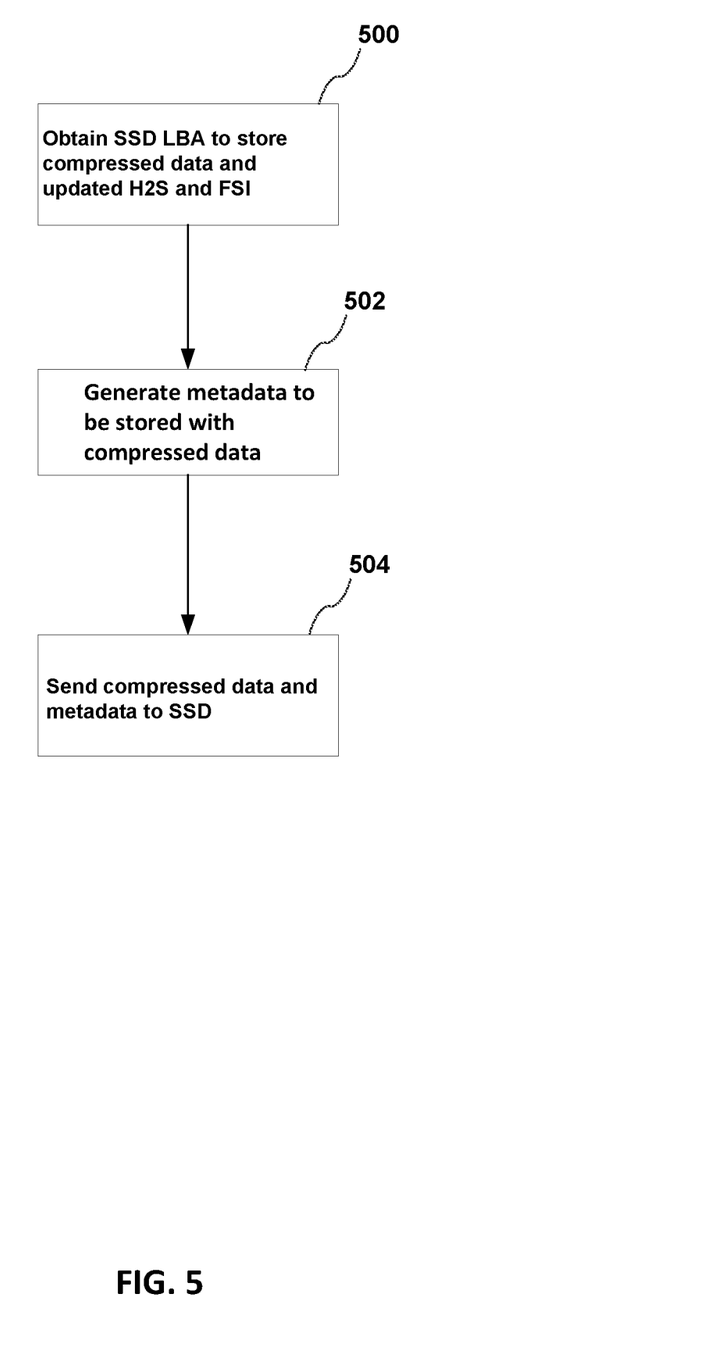
FIG. 5 is a flowgraph illustrating a write operation to write compressed data for an application to nonvolatile memory in the SSD.

FIG. 5 is a flowgraph illustrating a write operation to write compressed data for an application to non-volatile memory 122 in the SSD 118. A write request initiated by an application 134 executing in volatile host memory 126 to write data stored in host volatile memory to non-volatile memory 122 in the SSD 118 is processed by the file system 202 in the operating system (OS) 142.

As discussed earlier, data to be written to the nonvolatile memory in the SSD may be compressed using the CODEC 132 and the size of the compressed block of data output from the CODEC is determined by a compression manager (CM) 214 in the operating system 142.

At block 500, CSM DCL 208 queries the H2S mapping table 130 to obtain a SSD LBA to write the compressed data and the CSM DCL 208 updates the H2S mapping table 130 and FSI table 212 accordingly. Processing continues with block 502.

At block 502, Meta Marker/Parser 210 appends the compressed data size (number of sectors) 316 together with the Host LBA 314 and timestamp (TS) 318 in the metadata 310 contiguous with the compressed sector 308. Processing continues with block 504.

At block 504, the metadata 310 and compressed data (sectors c1, c2) are sent in a write command over communications link 340 to be written to non-volatile memory in the SSD. Processing is complete.

The metadata 310 stored with each sector of compressed data in the non-volatile memory 122 in the SSD 118 allows the mapping tables 146 to be recovered in the event of an unexpected shutdown of the computer system. During an orderly shutdown of the computer system, the H2S mapping table 130 and FSI table 212 are stored in non-volatile memory 122 in the SSD 118 together with a timestamp so that the most recently stored version of the H2S mapping table 130 and FSI table 212 can be retrieved when power is restored to the computer system 100. During startup after an orderly shutdown of the computer system 100, the H2S and FSI rebuilder 204 reads the saved H2S mapping table 130 and FSI table 212 with the latest timestamp from the SSD 118 and writes them to volatile host memory 126.

If the computer system 100 is not shutdown in an orderly manner, during startup the H2S and FSI rebuilder 204 rebuilds the H2S mapping table 130 and FSI table 212 in volatile host memory 126 using the metadata 310 stored with each sector of compressed data in the non-volatile memory 122 in the SSD 118.

Figure 6:
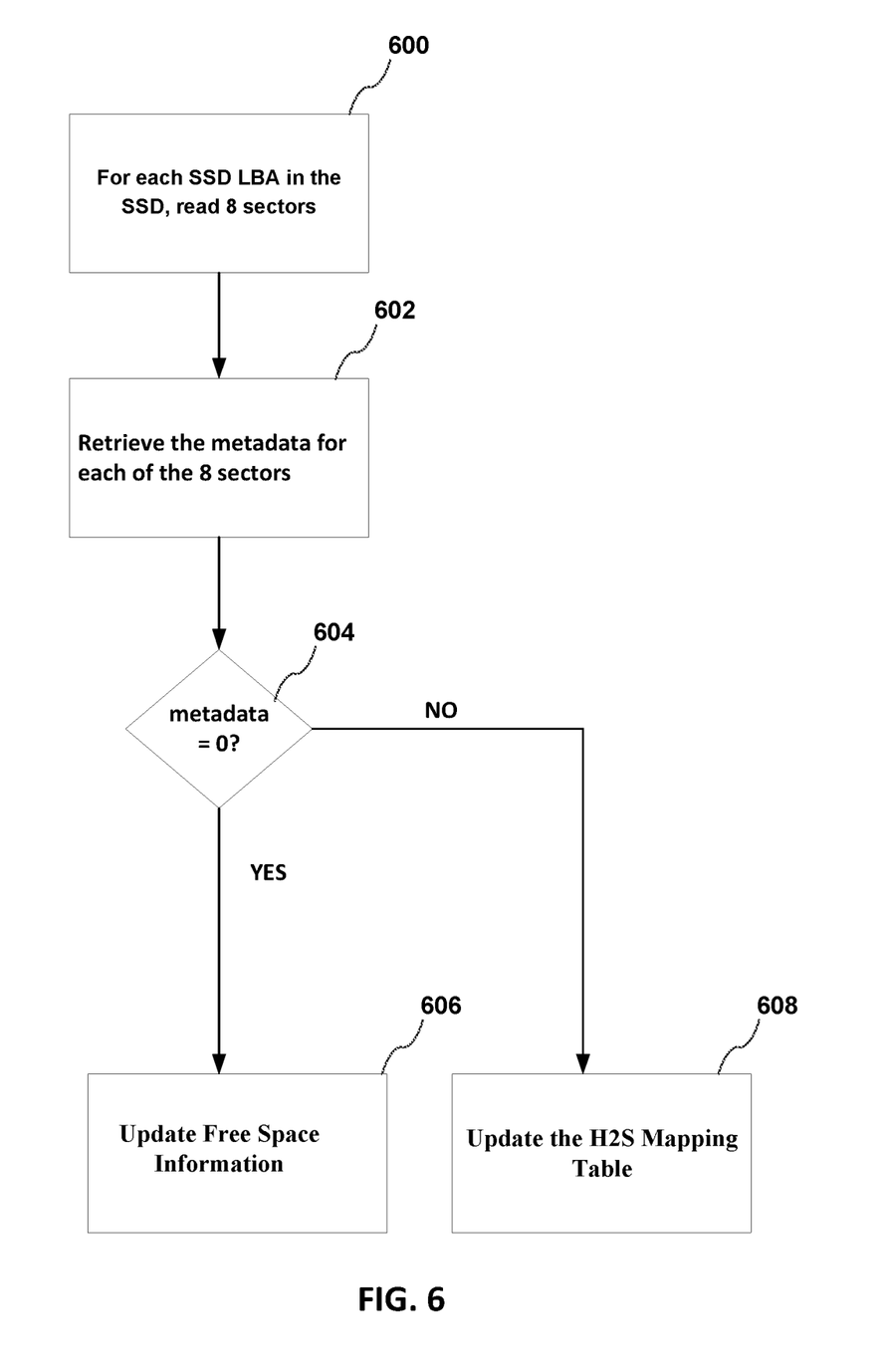
FIG. 6 is a flowgraph illustrating a restore operation to recover the mapping tables (H2S mapping table and FSI table) using the metadata stored with each sector of compressed data in the SSD.
Figure 7A:
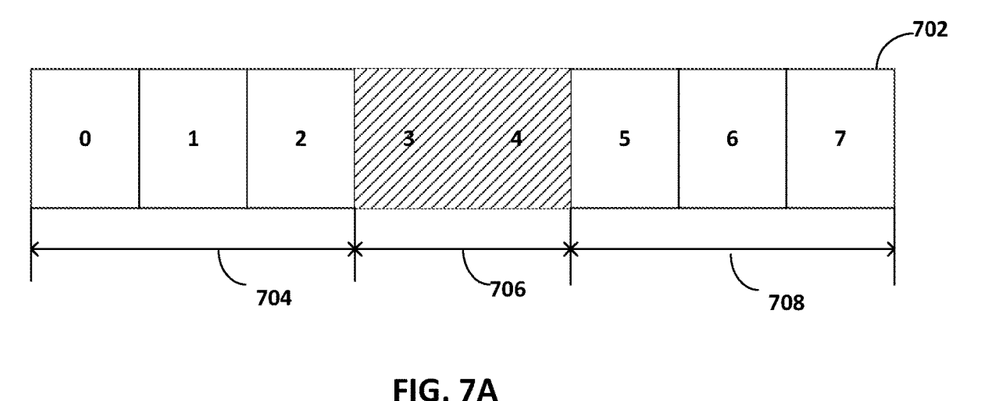
FIG. 7A is a block diagram illustrating eight contiguous SSD sectors in the SSD.
Figure 7B:
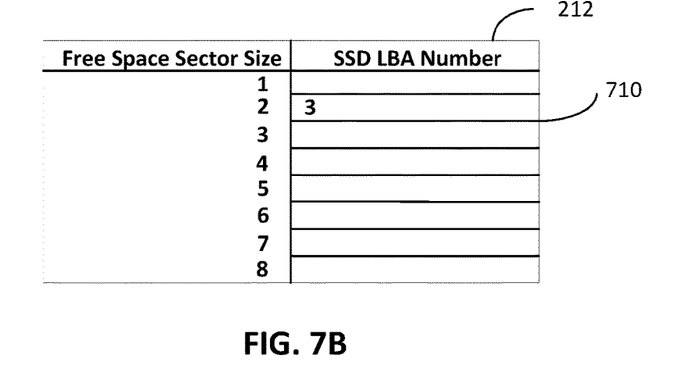
FIG. 7B illustrates entries in the FSI table after the metadata in each of the eight contiguous SSD sectors in FIG. 7A has been processed.
Figure 7C:
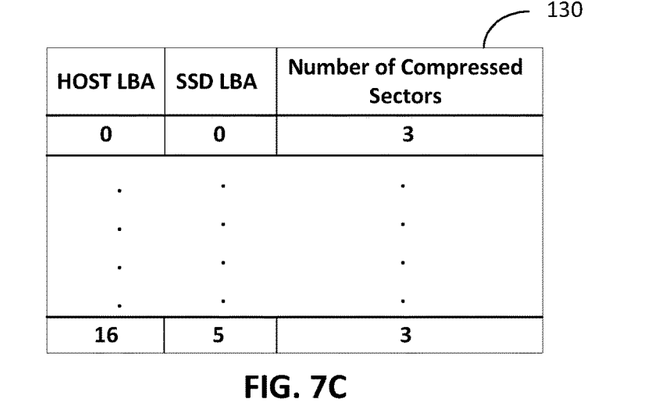
FIG. 7C illustrates entries in the H2S mapping table after the metadata in each of the eight contiguous SSD sectors in FIG. 7A has been processed.

FIG. 6 is a flowgraph illustrating a restore operation to recover the mapping tables 146 (H2S mapping table 130 and FSI table 212) using the metadata 310 stored with each sector of compressed data in the SSD 118. The restore operation will be described for a SSD 118 in which 512 B of data (compressed data and pad (if required)) plus 8 B of metadata is stored in each SSD sector. FIG. 7A is a block diagram illustrating eight contiguous SSD sectors in the SSD 118. FIG. 7B illustrates entries in the FSI table 212 after the metadata in each of the eight contiguous SSD sectors in FIG. 7A has been processed. FIG. 7C illustrates entries in the H2S mapping table 130 after the metadata in each of the eight contiguous SSD sectors in FIG. 7A has been processed. FIG. 6 will be described in conjunction with FIGS. 7A-7C.

At block 600, 8 SSD sectors from the SSD. For example, contiguous sectors 702 numbered 0-7 shown in FIG. 7A are read starting with SSD LBA 0 and ending with SSD LBA 7. Processing continues with block 602.

At block 602, the 8 B metadata stored with the 512 B compressed data for each of the 8 sectors is read. As described earlier, the metadata includes the Host LBA 314, size 316 and a timestamp 318. Processing continues with block 604.

At block 604, if the 8 B metadata has a non-zero value the sector is used and stores compressed data, processing continues with block 606. If the metadata has a zero value, the sector is not used, processing continues with block 608.

At block 606, the sector is not used and is added to an entry in the free space information table 212. For the example shown in FIG. 7A, the free space information table 212 is rebuilt by adding free sectors 3 and 4 706 to entry 710 in the free space information table 212 shown in FIG. 7B with sector 3 as the first sector of free space 706 having two sectors. Processing continues with block 604 to read the next sector of the SSD LBA or to block 600 to read the next SSD LBA or is complete if all SSD LBAs have been read.

At block 608, the sector is used and the entry in the H2S mapping table 130 in host volatile memory is written with the Host LBA, compression size and timestamp retrieved from the metadata for the sectors stored in the SSD. For the example shown in FIG. 7A, H2S mapping table 130 is rebuilt by adding an entry for the 3 contiguous sectors of Host LBA 0 that is stored as compressed data in sectors 0-3 704 (FIG. 7A) starting at SSD LBA 0 in the H2S mapping table 130 with Host LBA 0, SSD LBA 0 and Number of Compressed Sectors 3 as shown in the first entry in the H2S mapping table in FIG. 7C. Processing continues with block 604 to read the next sector of the SSD LBA or to block 600 to read the next SSD LBA or is complete if all SSD LBAs have been read.

For the example shown in FIG. 7A, the H2S mapping table 130 is rebuilt by adding an entry for the 3 contiguous sectors of Host LBA Number 16 that is stored as compressed data in sectors 5-7 706 (FIG. 7A) starting at SSD LBA 5 in the H2S mapping table 130 with Host LBA 16, SSD LBA 5 and Number of Compressed Sectors 3 as shown in the second entry in the H2S mapping table 130 in FIG. 7C.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. An apparatus comprising:
   compression logic to generate compressed data to be stored in a storage device;
   a volatile memory communicatively coupled to the compression logic to store a table, the table including a storage device block address to store the compressed data for a host block address and a number of storage device blocks to store the compressed data; and
   metadata logic to generate a metadata to store with the compressed data in the storage device, the metadata to allow the table to be restored after an unexpected shutdown.

2. The apparatus as claimed in claim 1, wherein the metadata comprises the host block address, a number of sectors to store the compressed data in the storage device, and a timestamp.

3. The apparatus as claimed in claim 1, further comprising:
   a free list to store an unused storage device logical block address and a number of unused sectors for the unused storage device logical block address, the metadata logic to use the metadata to restore the free list after the unexpected shutdown.

4. The apparatus as claimed in claim 1, wherein the storage device is a solid-state drive.

5. The apparatus as claimed in claim 4, wherein the compressed data is stored in at least one sector in the solid-state drive.

6. The apparatus as claimed in claim 5, wherein the at least one sector is 512 bytes and the metadata is 8 bytes.

7. The apparatus as claimed in claim 6, wherein the metadata is physically contiguous with the at least one sector in the solid-state drive.

8. A method comprising:
   generating compressed data to be stored in a storage device;
   storing, in a table in a volatile memory communicatively coupled to a compression logic, a storage device block address to store the compressed data for a host block address and a number of storage device blocks to store the compressed data; and
   generating a metadata to store with the compressed data in the storage device, the metadata to allow the table to be restored after an unexpected shutdown.

9. The method as claimed in claim 8, wherein the metadata comprises the host block address, a number of sectors to store the compressed data in the storage device, and a timestamp.

10. The method as claimed in claim 8, further comprising:
    storing, in a free list, an unused storage device logical block address and a number of unused sectors for the unused storage device logical block address; and
    using the metadata to restore the free list after the unexpected shutdown.

11. The method as claimed in claim 10, wherein the storage device is a solid-state drive.

12. The method as claimed in claim 11, wherein the compressed data is stored in at least one sector in the solid-state drive.

13. The method as claimed in claim 12, wherein the at least one sector is 512 bytes and the metadata is 8 bytes.

14. The method as claimed in claim 13, wherein the metadata is physically contiguous with the at least one sector in the solid-state drive.

15. A system comprising:
    compression logic to generate compressed data to be stored in a storage device;
    a volatile memory communicatively coupled to the compression logic to store a table, the table including a storage device block address to store the compressed data for a host block address and a number of storage device blocks to store the compressed data;
    metadata logic to generate a metadata to store with the compressed data in the storage device, the metadata to allow the table to be restored after an unexpected shutdown; and
    a display communicatively coupled to a processor to display the compressed data stored in the storage device.

16. The system as claimed in claim 15, wherein the metadata comprises the host block address, a number of sectors to store the compressed data in the storage device, and a timestamp.

17. The system as claimed in claim 15, further comprising:
    a free list to store an unused storage device logical block address and a number of unused sectors for the unused storage device logical block address, the metadata logic to use the metadata to restore the free list after the unexpected shutdown.

18. The system as claimed in claim 17, wherein the storage device is a solid-state drive.

19. The system as claimed in claim 18, wherein the compressed data is stored in at least one sector in the solid-state drive.

20. The system as claimed in claim 19, wherein the at least one sector is 512 bytes and the metadata is 8 bytes.

21. The system as claimed in claim 20, wherein the metadata is physically contiguous with the at least one sector in the solid-state drive.

22. At least one non-transitory computer-readable storage medium comprising instructions that, when executed, cause a system to:
    generate compressed data to be stored in a storage device;
    store, in a table in a volatile memory communicatively coupled to a compression logic, a storage device block address to store the compressed data for a host block address and a number of storage device blocks to store the compressed data; and
    generate a metadata to store with the compressed data in the storage device, the metadata to allow the table to be restored after an unexpected shutdown.

23. The non-transitory computer-readable storage medium as claimed in claim 22, wherein the metadata comprises the host block address, a number of sectors to store the compressed data in the storage device, and a timestamp.

24. The non-transitory computer-readable storage medium as claimed in claim 22, further comprising:
   store, in a free list, an unused storage device logical block address and number of unused sectors for the unused storage device logical block address; and
   use the metadata to restore the free list after the unexpected shutdown.

25. The non-transitory computer-readable storage medium as claimed in claim 22, wherein the storage device is a solid-state drive.

* * * * *